UNITED STATES PATENT OFFICE.

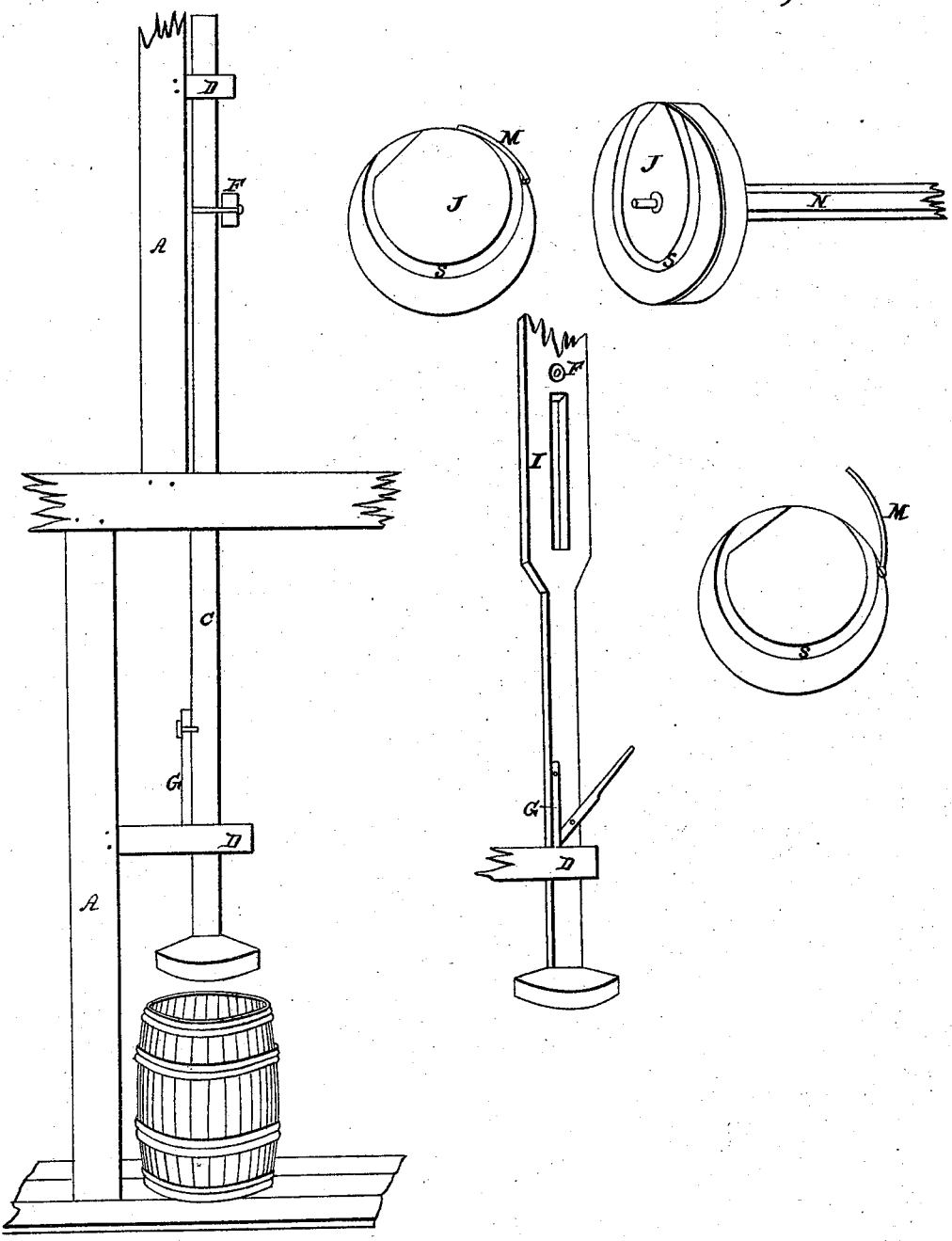

OLIVER JEWELL, OF ROCHESTER, NEW YORK.

IMPROVEMENT IN MACHINES FOR PACKING AND PRESSING FLOUR.

Specification forming part of Letters Patent No. 156, dated March 30, 1837.

*To all whom it may concern:*

Be it known that I, OLIVER JEWELL, of the city of Rochester, in the county of Monroe and State of New York, have invented certain Improvements in Machinery for Packing Flour in Barrels, &c.; and I do hereby declare that the following is a full and exact description thereof.

A piston-rod or staff is to be made to slide up and down in suitable guides attached to vertical posts A in any convenient part of a mill-house, and at the lower end of this rod or shaft there is to be a piston C or packing-head made in the usual way, which is to be forced down into the barrel or other vessel in which the flour is to be packed. The principal part of my improvement consists in the manner in which the piston-rod and piston are worked up and down, which I effect in the following manner.

Upon a horizontal shaft N, I fix a circular wheel or short cylinder, which I denominate the "power-wheel" J, because the power is to be communicated from it to the vertical rod or staff. One face or end of this power-wheel revolves nearly in contact with the rod or staff, and to enable it so to do there is a slot I through the rod of sufficient width to admit the gudgeon of the power-shaft to pass through it and of sufficient length to allow the rod to work up and down to the requisite distance. This rod is widened out at the part I, where the slot is made to give it the requisite strength. Upon the rod just above the slot there is a friction-roller F, which revolves upon a stout pin firmly fixed in the rod, and in the face of the power-wheel there is an eccentric groove of such width and depth as to receive and fit the roller. The face of the wheel may be formed altogether of iron or the groove may be formed by attaching iron plates to a wooden wheel. The eccentric groove I make circular, its inner edge on one side of it coinciding with the periphery of the power-wheel. It may be of two-thirds, three-fourths, or any preferred amount of the diameter of the power-wheel, which will determine its eccentricity, and consequently the extent to which it will work the packing-piston up and down. Thus, if the power-wheel be two feet in diameter and the eccentric groove sixteen inches the rod will be carried down and up eight inches at each revolution of the power-wheel.

The horizontal shaft and power-wheel will usually be placed in a room over the packing-room, where it is to be driven by any suitable gearing. When the rod is to remain at rest while the power-wheel revolves, the rod is to be raised so that the friction-roller F leaves the groove and stands above the periphery of the wheel. To enable it to do so, that part of the periphery of the wheel where the eccentric groove opens onto it is covered by a curved hinged strap M, which when closed down coincides with the periphery and would support the roller were it to fall upon it; but if opened the roller would enter the groove and the rod be worked up and down. To sustain the rod when it is wished that the piston should be at rest, there is a click or pall G affixed to it by a pin just above the lower guide D and resting upon it while it is kept stationary; but when it is turned up the rod descends so as to allow the friction-roller to enter the eccentric groove, and the staff is vibrated.

Having thus fully explained the construction of my apparatus for packing flour and shown the manner in which the same operates, I do hereby declare that I do not make any claim to several of the individual parts thereof, which I have described, as of my invention, as they constitute parts of other machines for the same or other purposes, all that I claim as new, and wish to secure by Letters Patent, being—

The application and employment of an eccentric groove upon the face of a revolving wheel to work the rod and piston of a machine for packing flour, the whole constructed, combined, and operating substantially in the manner herein set forth, and for the further illustration of which I have deposited a drawing thereof in the Patent Office.

OLIVER JEWELL.

Witnesses:
L. B. LANGWORTHY,
ISRAEL ANGELL.